United States Patent [19]

Gaudio et al.

[11] 4,173,657

[45] Nov. 6, 1979

[54] VEGETABLE PROTEIN INGREDIENT FOR KAMABOKO PRODUCTS CONTAINING A POLYSACCHARIDE

[75] Inventors: E. Lorna Gaudio, Edwardsville, Ill.; S. Kent Holt, Tokyo, Japan

[73] Assignee: Ralston Purina Company, St. Louis, Mo.

[21] Appl. No.: 879,190

[22] Filed: Feb. 21, 1978

[51] Int. Cl.$^2$ .......................... A23J 3/00; A23L 1/325
[52] U.S. Cl. ................................. 426/574; 426/643; 426/656
[58] Field of Search .................. 426/574, 643, 656

[56] References Cited

U.S. PATENT DOCUMENTS

| | | | |
|---|---|---|---|
| 3,891,776 | 6/1975 | Carpenter et al. | 426/574 X |
| 4,039,687 | 8/1977 | Weyn | 426/643 X |
| 4,062,409 | 12/1977 | Niki et al. | 426/643 |

FOREIGN PATENT DOCUMENTS

| | | | |
|---|---|---|---|
| 7118586 | 5/1971 | Japan | 426/643 |
| 50-13348 | 5/1975 | Japan | 426/574 |
| 7210618 | 2/1973 | Netherlands | 426/574 |
| 282915 | 12/1970 | U.S.S.R. | 426/643 |
| 301939 | 5/1976 | U.S.S.R. | 426/574 |

*Primary Examiner*—Robert A. Yoncoskle
*Attorney, Agent, or Firm*—Virgil B. Hill

[57] ABSTRACT

A vegetable protein composition which is suitable as a replacement for fresh or frozen fish in Kamaboko products is disclosed. The composition comprises a vegetable protein isolate and an added amount of a polysaccharide effective to whiten Kamaboko type products in which the vegetable protein composition is used as an ingredient.

5 Claims, No Drawings

VEGETABLE PROTEIN INGREDIENT FOR KAMABOKO PRODUCTS CONTAINING A POLYSACCHARIDE

BACKGROUND OF THE INVENTION

This invention relates to gelled fish products commonly referred to as "Kamaboko" type products, and to a vegetable protein composition which is an acceptable ingredient for gelled fish products.

"Kamaboko" is an immensely popular food in the Japanese diet and generally comprises an elastic, gelled, heat-pastuerized fish product. "Kamaboko" is made by separation of fish muscle, which is washed to remove blood, pigments and fat. The washed fish flesh is minced or reduced to a pulp and ground with other ingredients such as starch, sugar, egg white, salt and flavorings such as "mirin" and various flesh extracts. The resulting fish paste is then formed into the desired shape and cooked. There are three main types of "Kamaboko" products including Kamaboko, Chikuwa, and Agekama, each having its own shape and a specific manner of cooking associated with each type of product. For example, steaming is the cooking method of choice for most types of Kamaboko, whereas, broiling is used mainly for Chikuwa, and deep fat frying is used for Agekama.

The distinctive eating characteristic of "Kamaboko" type products is its elastic quality, called "ashi" in Japanese. This refers to the primary feature of this product wherein if it is subjected to pressure, it becomes indented, but can recover readily to its original shape after pressure removal. The elastic quality of "ashi" of Kamaboko depends on the species of fish used, freshness of the ingredients, as well as the processing techniques employed. Another limiting factor for Kamaboko quality besides texture is color, since a very white color is considered to be essential for a quality product. In spite of the critical importance of texture as a measure of Kamaboko quality, color is equally as critical since this is due primarily to the types of fish flesh employed and their relative whiteness. Unfortunately, many of the types of fish which are considered to be the most desirable from a textural as well as a color standpoint are very much in demand and, therefore, will be in increasingly short supply. This has necessitated the investigation of a variety of ingredients which can be employed as a total or partial replacement for the fish flesh employed in Kamaboko products. For example, U.S. Pat. Nos. 3,955,011 and 3,959,517 describe the production of a fish meat powder for making Kamaboko type products with a gel strength comparable to that of Kamaboko made from fresh fish meat.

Yasumetsu et al in Agr. Biol. Chem. 36, p. 737–744 (1972) has evaluated various types of soybean products in fish paste products. Among the types of soybean products evaluated are soy protein isolates, products which are well known in the vegetable protein processing industry. These products generally have a protein content of 90% or greater and are highly functional in the formation of gelled food products. They, therefore, are ideal candidates as a complete or partial replacement of fresh fish flesh in Kamaboko. Unfortunately, as described by the above authors, the use generally of soy protein isolates has not been successful since they detracted somewhat from the texture and overall quality of the Kamaboko products. The most serious defect encountered, however, with the use of soy protein isolates was the inferior color of Kamaboko products containing soy protein isolates. Kamaboko products containing soy protein isolates generally had a darker color and, therefore, represented a serious departure from color standards considered as a minimum for this type of product. Therefore, in spite of the consideration given to these materials as an ingredient for Kamaboko products they have generally been considered unsuitable as an ingredient, and modification of a vegetable protein isolate to permit use in a Kamaboko type product would represent a significant breakthrough.

It is an object of the present invention to produce a vegetable protein composition which is suitable as an ingredient in Kamaboko products.

It is also an object of the present invention to produce a vegetable protein composition which does not impart an undesirable color to Kamaboko products when used as partial replacement for fresh fish flesh.

It is a further object to produce Kamaboko products containing a vegetable protein isolate as a partial replacement for fresh fish wherein acceptable color and texture of the product is maintained.

SUMMARY OF THE INVENTION

The present invention comprises a vegetable protein composition which can be employed at least as a partial replacement for fresh or frozen fish flesh in Kamaboko products. This composition comprises a mixture of a vegetable protein material such as a vegetable protein isolate and an added amount of a polysaccharide effective to whiten gelled fish products when said vegetable protein composition is used as an ingredient therein. The dried composition can be used as a partial replacement for fresh fish in "Kamaboko" type products at a level up to about 90% by weight of the fish flesh without adversely affecting the color or texture of the product. It is, of course, essential to produce a product which is essentially white in appearance with a good elastic, gelled texture. Both of these are the primary factors, other than flavor for the sensory evaluation of gelled fish products such as Kamaboko.

The vegetable protein composition of the present invention comprises a vegetable protein isolate together with an added amount of a polysaccharide effective to whiten "Kamaboko" type or gelled fish products incorporating the vegetable protein material as an ingredient. Specific types of polysaccharides which are suitable for use in the present invention include alginates or salts thereof, locust bean gum, carrageenan or salts thereof, xanthan gum, guar gum, methyl cellulose, pectin and carboxymethyl cellulose. These polysaccharides upon addition to the vegetable protein material unexpectedly have been found to whiten Kamaboko type products to which the vegetable protein material is added as an ingredient. This vegetable protein composition when used in Kamaboko products at typical levels up to 90% by weight of the fish flesh provide products which have acceptable whiteness thereby obviating the difficulties previously encountered in attempting to use vegetable protein isolates as ingredients for gelled fish products.

DESCRIPTION OF THE PREFERRED EMBODIMENTS

For purposes of a better understanding of the general type of gelled fish products to which the present invention relates, Kamaboko type products are typically produced pursuant to the following procedure, although actual formulas and techniques will vary, depending on local tastes and customs in Japan.

Fish used as the starting material for Kamaboko are beheaded and eviscerated followed by mechanical separation of the flesh from the skin and bones. This is usually accomplished by pressing the fish through a perforated drum or plate to separate the flesh from the skin and bones. This separated flesh is minced as a result of the above procedure and this material is washed with chilled water to remove residual blood, pigments, mucus, and fat. Any one of these materials would, of course, detract from either the color or texture of the Kamaboko product. One part by weight of fish flesh is stirred with five to seven parts of chilled water and the entire operation is repeated a number of times. The washed fish flesh is then dewatered by pressing or centrifugation.

The dewatered minced flesh is reduced to a pulp and ground with salt and other ingredients for 30–50 Grinding is carried out by a combination of kneading and crushing of the fish muscle to produce a sticky paste. The ingredients used in Kamaboko vary widely dependent on the type of product, cost, or locale of production, therefore, a listing of specific materials used in Kamaboko would be difficult. The most common ingredients include salt, usually 2.5–4%, flavoring or seasoning ingredients such as sugar, monosodium glutamate and inosinate, flesh extractives, and "mirin". Egg white is added to improve glossiness of the product and starch is added when necessary to improve elasticity of the product.

The ground fish paste is then shaped into the desired form and cooked depending on the specific type of Kamaboko product desired. For example, steaming is used for most types of Kamaboko products, whereas broiling and deep fat frying are also used.

The vegetable protein composition of the present invention, can be employed in any general type of process for the production of "Kamaboko" type products, at least as a partial replacement for fish flesh and the specific point in the process at which it is included is not critical. For example, the vegetable protein composition of the present invention can be dry blended with the fish flesh and water either prior to or subsequent to grinding of the product. It is, however, preferred for ease and convenience that the vegetable protein composition of the present invention be hydrated in a typical but non-limiting ratio of 1 part vegetable protein material to 4 parts water, followed by addition to the fish flesh before grinding. In this manner, the best distribution of the vegetable protein material is obtained commensurate with the desired improvement in texture and color.

The level at which the vegetable protein composition of the present invention may be employed in Kamaboko type products will again vary widely depending on color, texture, and flavor of the product. At the very least, it is considered preferably in order to retain the desired flavor in the Kamaboko product to provide a sufficient level of fresh fish in order to maintain the desired taste and flavor. Therefore, even though higher levels of the vegetable protein composition will still produce acceptable products from a color or textural standpoint, the product may not be recognized exactly as "Kamaboko" per se because of the low levels of fish. Therefore, for purposes of the present invention, the vegetable protein composition developed herein may be used as a functional replacement for fish flesh in "Kamaboko" type products at levels of up to about 90% by weight of the fish flesh although, if one is attempting to retain a recognized standard of identity for Kamaboko, a preferred compromise isofar as texture, color, and flavor is to replace only up to about 30% of the fish flesh.

Vegetable protein isolates are well known in the art and include isolated protein fractions from oilseeds such as soybeans, cottonseed and the like. Soy isolates are, of course, the most widely used and generally have a protein content of 90–95%. These isolates are generally produced by dissolving the soy product above or below the isoelectric point of the soy protein and then adjusting the pH of the solution to the isoelectric point to precipitate the purified protein. The present invention is not intended to be limited by the specific type of isolate which may be employed in the vegetable protein composition of the present invention. Numerous types of isolates may be employed including those which have been further processed in some fashion to improve functional properties such as gel forming ability, flavor, color, and the like. Preferred isolates for use in the present invention are soy isolates produced generally pursuant to the processes set forth in U.S. Pat. No. 3,642,490 and 3,694,221.

The vegetable protein composition of the present invention in addition to a protein isolate also includes an amount of a polysaccharide effective to whiten gelled fish products to which the vegetable protein composition is added as an ingredient. Specific types of polysaccharide materials which have been found effective for whitening gelled fish products without detracting from the texture include alginates and salts thereof, carrageenan and salts thereof, locust bean gum, xanthan gum, guar gum, methyl cellulose, pectin and carboxymethyl cellulose. Preferred materials are the alginates and locust bean gum. These polysaccharides upon addition to the vegetable isolate provide a vegetable protein composition that can be used as a replacement for a portion of the fresh fish flesh in gelled fish products without detracting from the texture or color of the product.

Typical levels of these polysaccharides which are suitable to improve the whiteness of "Kamaboko" type gelled fish products are set forth below expressed as a percentage of the gelled fish product rather than as a percentage of the vegetable protein material in order to take into account the level of use of the vegetable protein material in the gelled fish product. Typical replacement levels of the fresh fish for the vegetable protein composition of the present invention will be up to about 90% by weight of the fish flesh, with a preferred replacement level of about 30% by weight.

Table I

| Polysaccharide | % by Weight of Gelled Fish Product | |
|---|---|---|
| | Minimum % | Typical Range |
| Alginates | 0.1% | 0.1–0.5% |
| Locust Bean Gum | 0.2% | 0.2–0.8% |
| Xanthan Gum | 0.125% | 0.125–0.5% |
| Carrageenans | 0.125% | 0.125–0.5% |
| Guar Gum | 0.075% | 0.075–0.5% |
| Methyl Cellulose | 0.225% | 0.0225–0.5% |
| Pectin | 0.3% | 0.3–0.5% |
| Carboxymethyl Cellulose | 0.1% | 0.1–0.5% |

The above minimum amounts are those effective to produce a sufficient improvement in whiteness in the gelled fish product when vegetable protein is used without serious alteration of the textural properties. The necessary amount of polysaccharide can be dry blended with the vegetable protein material prior to adding to the gelled fish formula or can be added to the product separately. An optional way of forming the vegetable protein composition of the present invention is to blend the polysaccharide into the vegetable proteinaceous material or slurry prior to drying thereof. This eliminates the necessity of a separate step for dry blending of the protein material and the polysaccharide.

The following Examples are set forth to provide specific but non-limiting illustrations of the present invention. Each of the "Kamaboko" type products produced for the comparative tests set forth in these Examples was prepared by taking 2,000 g of frozen surimi, tempering at −1° to −2° C. and chopping into small cubes. The cubes were then placed in a food chopper and chopped for between 30 seconds and 1 minute. The temperature of the surimi is then at 2° C. 30 gm of salt and 20 g of monosodium glutamate are then slowly added to the mixture while the food chopper is in continuous operation. After 1 minute, an additional 30 g of salt is added. The mixture is then chopped for an additional 3-4 minutes and 30 g of sugar added. The temperature of the mixture at this point should not be above 10° C. or below 8° C.

500 g of ice water and 200 g of starch is then mixed and added to the chopper which is in continuous operation over a 2 minute period. The product is then removed from the bowl and kneaded for 30 seconds using a spatula. The kneaded product is then extruded into a casing which is maintained in a 40° C. water bath for 1 hour followed by heating in a 90° C. bath for 40 minutes. The products are then cooled, stored overnight at 40° F., and were then evaluated for color and texture.

EXAMPLES 1-8

A soy protein isolate, generally produced pursuant to the procedure set forth in U.S. Pat. No. 3,694,221 sold commercially by Ralston Purina Company, St. Louis, Mo. U.S.A. and identified by the tradename "Supro 620" was selected for the following comparative tests. The soy isolate was used as a 30% by weight replacement for the fresh fish flesh in a number of the following products whereas the control consisted of a conventional "Kamaboko" type product without any added vegetable protein material. Products were produced pursuant to the procedure set forth above and the polysaccharide materials were dry blended with the vegetable protein material prior to in making the Kamaboko type products. All amounts of added polysaccharide are expressed as a percentage of the gelled fish products.

[a] Instrom textural evaluation on a Universal Instron Testing Machine with 5 inches/minute crosshead speed and 10 inches/minute chart speed, using an instron probe measuring 0.25 inches in diameter wherein gel strength is the force necessary to fracture the sample. Elasticity is the distance the probe goes into the sample before fracturing represented as a percent of sample height. Ashi is the product of the average gel strength and elasticity divided by 100. Four cylindrical samples, 21 mm×0.75 inches were used for the above tests at a temperature of 25° C.

[b] Color evaluation on a Hunter Lab Colorimeter wherein color is measured by comparative readings on a "L", "a", "b" scale. Single slices, 78 mm in diameter, were used for the above tests.

Example 1

TEXTURAL MEASUREMENTS AND COLOR OF KAMABOKO PRODUCTS CONTAINING SOY ISOLATE AND A SOY ISOLATE/ALGINATE AT 30% REPLACEMENT FOR FRESH FISH

| Sample | Gel Strength (gm) | Elasticity (%) | a Ashi (gm) | Color[b] L | a | b |
|---|---|---|---|---|---|---|
| Control | 438 ± 52 | 49 ± 3 | 214 | 69.5 | −1.7 | 7.5 |
| Soy Isolate | 516 ± 24 | 57 ± 2 | 294 | 65.6 | −0.9 | 11.3 |
| Soy Isolate/ 0.1% Sodium Alginate | 493 ± 21 | 55 ± 2 | 272 | 68.3 | −0.6 | 12.3 |
| Soy Isolate/ 0.3% Sodium Alginate | 401 ± 13 | 46 ± 2 | 184 | 68.6 | −0.7 | 12.0 |
| Soy Isolate/ 0.5% Sodium Alginate | 331 ± 45 | 38 ± 3 | 127 | 68.7 | −0.6 | 12.2 |

EXAMPLE 2

TEXTURAL MEASUREMENTS AND COLOR OF KAMABOKO PRODUCTS CONTAINING SOY ISOLATE AND A SOY ISOLATE LOCUST BEAN GUM AT 30% REPLACEMENT FOR FRESH FISH

| Day | Sample | Gel Strength (gm) | Elasticity (%) | a Ashi (gm) | Color[b] L | a | b |
|---|---|---|---|---|---|---|---|
|  | Control | 438 ± 52 | 49 ± 3 | 214 | 69.5 | −1.7 | 7.5 |
|  | Soy Isolate | 516 ± 24 | 57 ± 2 | 294 | 65.6 | −0.9 | 11.3 |
| 1 | Soy Isolate/ 0.3% Locust Bean Gum | 504 ± 43 | 56 ± 3 | 285 | 67.6 | −0.9 | 11.7 |
|  | Soy Isolate/ 0.5% Locust Bean Gum | 468 ± 23 | 58 ± 2 | 270 | 68.6 | −0.9 | 11.5 |
|  | Soy Isolate/ 0.8% Locust Bean Gum | 492 ± 20 | 58 ± 1 | 287 | 69.8 | −0.9 | 11.7 |
|  | Control | 536 ± 11 | 62 ± 2 | 334 | 69.0 | −1.6 | 7.9 |
| 2 | Soy Isolate | 428 ± 14 | 57 ± 2 | 244 | 64.9 | −0.9 | 11.1 |
|  | Soy Isolate/ 0.2% Locust Bean Gum | 382 ± 20 | 54 ± 2 | 208 | 66.5 | −0.8 | 11.4 |

EXAMPLE 3

TEXTURAL MEASUREMENTS AND COLOR OF KAMABOKO PRODUCTS CONTAINING SOY ISOLATE AND SOY ISOLATE/XANTHAN GUM AT 30% REPLACEMENT FOR FRESH FISH

| Day | Sample | Textural Measurement (Instron Evalulation) | | a Ashi | Color[b] | | |
|---|---|---|---|---|---|---|---|
| | | Gel Strength (gm) | Elasticity (%) | (gm) | L | a | b |
| 1 | Control | 408 ± 18 | 55 ± 2 | 224 | 69.6 | −1.5 | 7.5 |
| | Soy Isolate | 445 ± 34 | 52 ± 2 | 233 | 65.7 | −1.1 | 10.4 |
| | Soy Isolate/ 0.5% Xanthan Gum | 413 ± 34 | 51 ± 1 | 212 | 70.4 | −0.2 | 11.0 |
| 2 | Control | 333 ± 9 | 50 ± 0 | 166 | 68.5 | −1.5 | 8.4 |
| | Soy Isolate | 347 ± 12 | 46 ± 2 | 159 | 64.9 | −0.9 | 11.1 |
| | Soy Isolate/ 0.125% Xanthan Gum | 384 ± 39 | 54 ± 1 | 209 | 68.4 | −0.7 | 11.9 |

EXAMPLE 4

TEXTURAL MEASUREMENTS AND COLOR OF KAMABOKO PRODUCTS CONTAINING SOY ISOLATE AND SOY ISOLATE/CARRAGEENAN AT 30% REPLACEMENT FOR FRESH FISH

| Day | Sample | Textural measurement (Instron Evaluation) | | a Ashi | Color[b] | | |
|---|---|---|---|---|---|---|---|
| | | Gel Strength (gm) | Elasticity (%) | (gm) | L | a | b |
| 1 | Control | 536 ± 11 | 62 ± 2 | 334 | 69.0 | −1.6 | 7.9 |
| | Soy Isolate | 428 ± 14 | 57 ± 2 | 244 | 64.9 | −0.9 | 11.1 |
| | Soy Isolate/ 0.125% Sodium Carrageenan | 402 ± 6 | 56 ± 2 | 227 | 66.4 | −0.9 | 11.2 |
| 2 | Control | 444 ± 47 | 54 ± 1 | 242 | 68.5 | −1.7 | 7.8 |
| | Soy Isolate | 313 ± 21 | 55 ± 2 | 172 | 65.3 | −0.8 | 11.3 |
| | Soy Isolate/ 0.15% Sodium Carrageenan | 319 ± 17 | 53 ± 1 | 170 | 67.2 | −0.6 | 12.0 |
| 3 | Control | 408 ± 18 | 55 ± 2 | 224 | 69.6 | −1.5 | 7.5 |
| | Soy Isolate | 445 ± 34 | 52 ± 2 | 233 | 65.7 | −1.1 | 10.4 |
| | Soy Isolate/ 0.5% Sodium Carrageenan | 396 ± 18 | 51 ± 1 | 198 | 70.8 | −0.5 | 10.8 |

EXAMPLE 5

TEXTURAL MEASUREMENTS AND COLOR OF KAMABOKO PRODUCTS CONTAINING SOY ISOLATE AND SOY ISOLATE/GUAR GUM AT 30% REPLACEMENT FOR FRESH FISH

| Day | Sample | Textural Measurement (Instron) | | a Ashi | Color[b] | | |
|---|---|---|---|---|---|---|---|
| | | Gel Strength (gm) | Elasticity (%) | (gm) | L | a | b |
| 1 | Control | 536 ± 11 | 62 ± 2 | 334 | 69.0 | −1.6 | 7.9 |
| | Soy Isolate | 428 ± 14 | 57 ± 2 | 244 | 64.9 | −0.9 | 11.1 |
| | Soy Isolate/ .075% Guar Gum | 355 ± 17 | 56 ± 2 | 200 | 67.8 | −0.8 | 11.3 |
| 2 | Control | 504 ± 35 | 58 ± 5 | 294 | 68.3 | −1.7 | 7.7 |
| | Soy Isolate | 534 ± 26 | 60 ± 1 | 319 | 65.8 | −1.0 | 11.2 |
| | Soy Isolate/ 0.1% Guar Gum | 379 ± 16 | 59 ± 2 | 224 | 68.8 | −0.9 | 11.6 |
| 3 | Control | 500 ± 102 | 57 ± 3 | 291 | 69.4 | −1.6 | 7.4 |
| | Soy Isolate | 488 ± 13 | 55 ± 0 | 268 | 65.1 | −0.9 | 10.5 |
| | Soy Isolate/ 0.5% Guar Gum | 347 ± 34 | 60 ± 1 | 206 | 73.0 | −0.6 | 10.5 |

EXAMPLE 6

TEXTURAL MEASUREMENTS AND COLOR OF KAMABOKO PRODUCTS CONTAINING SOY ISOLATE AND SOY ISOLATE/METHYL CELLULOSE AT 30% REPLACEMENT FOR FRESH FISH

| Day | Sample | Textural Measurement (Instron) | | a Ashi | Color[b] | | |
|---|---|---|---|---|---|---|---|
| | | Gel Strength (gm) | Elasticity (%) | (gm) | L | a | b |
| | Control | 429 ± 30 | 47 | 35 2 202 | 69.6 | −1.5 | 7.4 |

EXAMPLE 6-continued

TEXTURAL MEASUREMENTS AND COLOR OF KAMABOKO PRODUCTS CONTAINING SOY ISOLATE AND SOY ISOLATE/METHYL CELLULOSE AT 30% REPLACEMENT FOR FRESH FISH

| Day | Sample | Textural Measurement (Instron) | | a Ashi (gm) | Color[b] | | |
|---|---|---|---|---|---|---|---|
| | | Gel Strength (gm) | Elasticity (%) | | L | a | b |
| 1 | Soy Isolate | 529 ± 23 | 57 ± 2 | 298 | 66.0 | −0.7 | 11.3 |
| | Soy Isolate/ 0.5% Methyl Cellulose | 376 ± 24 | 51 ± 1 | 192 | 67.9 | −0.5 | 11.9 |
| | Control | 536 ± 11 | 62 ± 2 | 334 | 69.0 | −1.6 | 7.9 |
| 2 | Soy Isolate | 428 ± 14 | 57 ± 2 | 244 | 64.9 | −0.9 | 11.1 |
| | Soy Isolate/ .225% Methyl Cellulose | 322 ± 7 | 48 ± 1 | 154 | 66.4 | −0.8 | 11.4 |

EXAMPLE 7

TEXTURAL MEASUREMENTS AND COLOR OF KAMABOKO PRODUCTS CONTAINING SOY ISOLATE AND SOY ISOLATE/PECTIN AT 30% REPLACEMENT FOR FRESH FISH

| Days | Sample | Textural Measurement (Instron) | | a Ashi (gm) | Color[b] | | |
|---|---|---|---|---|---|---|---|
| | | Gel Strength (gm) | Elasticity (%) | | L | a | b |
| | Control | 429 ± 30 | 47 ± 2 | 202 | 69.6 | −1.5 | 7.4 |
| 1 | Soy Isolate | 529 ± 23 | 57 ± 2 | 298 | 66.0 | −0.7 | 11.3 |
| | Soy Isolate/ 0.5% Pectin | 380 ± 12 | 48 ± 2 | 157 | 67.2 | −0.5 | 12.1 |
| | Control | 333 ± 9 | 50 ± 0 | 166 | 68.5 | −1.5 | 8.4 |
| 2 | Soy Isolate | 347 ± 12 | 46 ± 2 | 159 | 64.9 | −0.9 | 11.1 |
| | Soy Isolate/ 0.3% Pectin | 364 ± 19 | 47 ± 2 | 172 | 67.8 | −0.5 | 12.1 |

EXAMPLE 8

TEXTURAL MEASUREMENTS AND COLOR OF KAMABOKO PRODUCTS CONTAINING SOY ISOLATE AND SOY ISOLATE/CARBOXYMETHYL CELLULOSE (CMC) AT 30% REPLACEMENT OF FRESH FISH

| Day | Sample | Textural Measurement (Instron) | | a Ashi (gm) | Color[b] | | |
|---|---|---|---|---|---|---|---|
| | | Gel Strength (gm) | Elasticity (%) | | L | a | b |
| | Control | 408 ± 18 | 55 ± 2 | 224 | 69.6 | −1.5 | 7.5 |
| 1 | Soy Isolate | 445 ± 34 | 52 ± 2 | 233 | 65.7 | −1.1 | 10.4 |
| | Soy Isolate/ 0.5% CMC | 369 ± 12 | 48 ± 2 | 176 | 71.2 | −0.8 | 10.8 |
| | Control | 503 ± 22 | 62 ± 3 | 310 | 68.1 | −1.7 | 8.0 |
| 2 | Soy Isolate | 436 ± 33 | 56 ± 2 | 243 | 64.9 | −1.0 | 11.4 |
| | Soy Isolate/ 0.1 CMC | 360 ± 20 | 55 ± 2 | 198 | 67.2 | −1.0 | 11.6 |

With reference to the above Examples, it may be seen that products containing soy protein isolate alone showed a darker color than the control as evidenced by a lowering of the "L" value. By contrast, when a polysaccharide was also included with the soy isolate whiteness of the product was improved in every case, and dependent on the level of addition, equaled or even exceeded "whiteness" of control samples.

Having described the present invention with reference to these specific embodiments, it is to be understood that numerous variations may be made without departing from the spirit of the present invention and it is intended to encompass such measurable variations or equivalents within the scope thereof.

We claim:

1. A gelled fish product comprising fish and a composition consisting essentially of a soy protein isolate and a polysaccharide in an added amount by weight of the fish product, selected from the group consisting of 0.1 to 0.5% alginates and salts thereof, 0.2 to 0.8% locust bean gum, 0.0125 to 0.5% xanthan gum, 0.125 to 0.5% carrageenans and salts thereof, 0.075 to 0.5% guar gum, 0.0225 to 0.5% methyl cellulose, 0.3 to 6.5% pectin, and 0.1 to 0.5% carboxymethyl cellulose, wherein the level of said composition does not exceed about 90% by weight of the fish flesh.

2. The gelled fish product of claim 1 wherein the level of said composition does not exceed about 30% by weight of the fish flesh.

3. The process of preparing a gelled fish product comprising:

(a) blending fish flesh with a composition consisting essentially of a soy protein isolate and an added amount of a polysaccharide effective to whiten said fish product, said polysaccharide being selected from the group consisting of alginates, locust bean gum, xanthan gum, carrageenans, guar gum, methyl cellulose, pectin, and carboxymethyl cellulose, and mixtures thereof, wherein the level of said composition does not exceed about 90% by weight of the fish flesh; to form a paste, (b) shaping said paste and heating to form a gelled product.

4. The process of claim 3 wherein the level of said composition does not exceed about 30% by weight of said fish flesh.

5. The process of claim 3 wherein the added amount by weight is 0.1 to 0.5% alginates and salts thereof, 0.2 to 0.8% locust bean gum, 0.0125 to 0.5% xanthan gum, 0.125 to 0.5% carageenans and salts thereof, 0.075 to 0.5% guar gum, 0.0225 to 0.5% methyl cellulose, 0.3 to 6.5% pectin, and 0.1 to 0.5% carboxymethyl cellulose.

* * * * *

UNITED STATES PATENT AND TRADEMARK OFFICE
CERTIFICATE OF CORRECTION

PATENT NO. : 4,173,657

DATED : November 6, 1979

INVENTOR(S) : E. Lorna Gaudio et al.

It is certified that error appears in the above—identified patent and that said Letters Patent is hereby corrected as shown below:

Column 3, line 19, "for 30-50 Grinding" should read "for 30-50 minutes. Grinding"

Column 6, line 9, "[a]Instrom" should read "[a]Instron"

Column 7, Example 6, line 10, "47 35 2" should read "47 $\pm$ 2"

Column 9, Example 8, line 17, "436 # 33" should read "436 $\pm$ 33"

Signed and Sealed this

Seventeenth Day of June 1980

[SEAL]

Attest:

SIDNEY A. DIAMOND

Attesting Officer

Commissioner of Patents and Trademarks